United States Patent [19]

Reiffel et al.

[11] Patent Number: 4,654,484
[45] Date of Patent: Mar. 31, 1987

[54] VIDEO COMPRESSION/EXPANSION SYSTEM

[75] Inventors: Leonard Reiffel; Wayne D. Jung; Richard A. Karlin; Raphael K. Tam, all of Chicago, Ill.

[73] Assignee: Interand Corporation, Chicago, Ill.

[21] Appl. No.: 515,762

[22] Filed: Jul. 21, 1983

[51] Int. Cl.$^4$ .......................... H04N 7/14; H04N 7/12
[52] U.S. Cl. ........................................ 379/53; 358/133
[58] Field of Search ............ 179/2 TV, 2 TS; 358/85, 358/133, 136, 134

[56] References Cited

U.S. PATENT DOCUMENTS

| | | | |
|---|---|---|---|
| 3,950,607 | 4/1976 | Southworth et al. | 179/2 TV X |
| 4,191,970 | 3/1980 | Witsenhausen et al. | 358/136 X |
| 4,193,096 | 3/1980 | Stoffel | 358/133 X |
| 4,222,076 | 9/1980 | Knowlton | . |
| 4,258,387 | 3/1981 | Lemelson et al. | 358/85 |
| 4,261,018 | 4/1981 | Knowlton | 358/133 X |
| 4,494,144 | 1/1985 | Brown | 179/2 TV X |
| 4,513,317 | 4/1985 | Ruoff, Jr. | 358/133 |
| 4,581,638 | 4/1986 | Chiariglione et al. | 358/133 X |
| 4,605,963 | 4/1986 | Reitmeier et al. | 358/133 X |

OTHER PUBLICATIONS

"Picture Mode for Prestel", J. W. Allnatt, et al., *International Broadcast Engineer*, pp. 20-23, Nov. 1980, vol. 11, No. 174.
"Transmission Techniques for Picture Viewdata", R. C. Nicol, et al., IBC-80, IEE Conference Publication, pp. 109-113.
"Visual Services Trial, The British Telecom System for Teleconferencing and New Visual Services", J. E. Thompson (pp. 127-132).
"Image Processing for Communication", Arun N. Netraveli, *Innovations in Telecommunications*, pp. 97-134, ©1982 by Academic Press, Inc.
"Transform Picture Coding", Paul W. Wintz, *Proceedings of the IEEE*, vol. 60, No. 7, Jul. 1972, pp.809-820.
"Spatio/Temporal Prefiltering for a Videoconference Coder", D. I. Crawford, *International Conference on Electronic Processing*.
"Reversible Image Compression", Larry Bernard Grim, Dissertation at University of Pennsylvania (1980); reprinted on demand by University Microfilms International.
J. P. Temime, "Interframe Picture Coding at Low Bit Rates with Error Resistance", IEEE, 1980 International Conference on Communications, Seattle, Wash., Jan. 8-12, 1980, pp. 31.5.1-31.5.5.
Barnette et al., "Bandwidth Reduction for Television", *RCA Technical Notes*, No. 152, 1958.
Bacchi et al., "Real-Time Orthoganal Transformation of Color-Television Pictures", *Philips Technical Review*, vol. 38, No. 4/5, 1978/79, pp. 119-130.
Netravali et al., "Luminance Adaptive Coding of Chrominance Signals", *IEEE Transactions on Communications*, vol. Com.-27, No. 4, Apr. 1979, pp. 703-710.

*Primary Examiner*—Keith E. George
*Attorney, Agent, or Firm*—Kirkland & Ellis

[57] ABSTRACT

An improved apparatus for rapidly compressing, expanding, and displaying broad band information which is transmitted over a narrow band communications channel. In the preferred embodiment, a video image is cyclically assembled in low resolution and high resolution phases from digitized data representing gray level intensity for individual pixels which have been grouped into pixel. During the initial cycle of the low resolution phase, a representative sample of cell intensity values is transmitted by a sending station to a receiving station according to a video compression routine. The receiving station then uses a video expansion routine to calculate an intensity value for those pixels whose intensity values were not transmitted and displays an initial image. This image is refined during subsequent low-resolution cycles by additional transmissions from the sending station which replace the calculated cell intensity values with an actual or better approximation value for that pixel. During the high resolution phase, an error determination routine or external input from a viewer selects those pixels containing the greatest deviation in intensity levels from the input video image. The error compression and expansion routines substitute a plurality of individual pixel intensity values for previously calculated intensity values. The present invention also discloses an apparatus for allowing color capable stations to send or receive color transmissions while retaining the capability to interact with noncolor stations. Color data is compressed and interleaved with black and white data by a color capable sending station and subsequently separated and expanded by a color capable receiving station.

64 Claims, 13 Drawing Figures

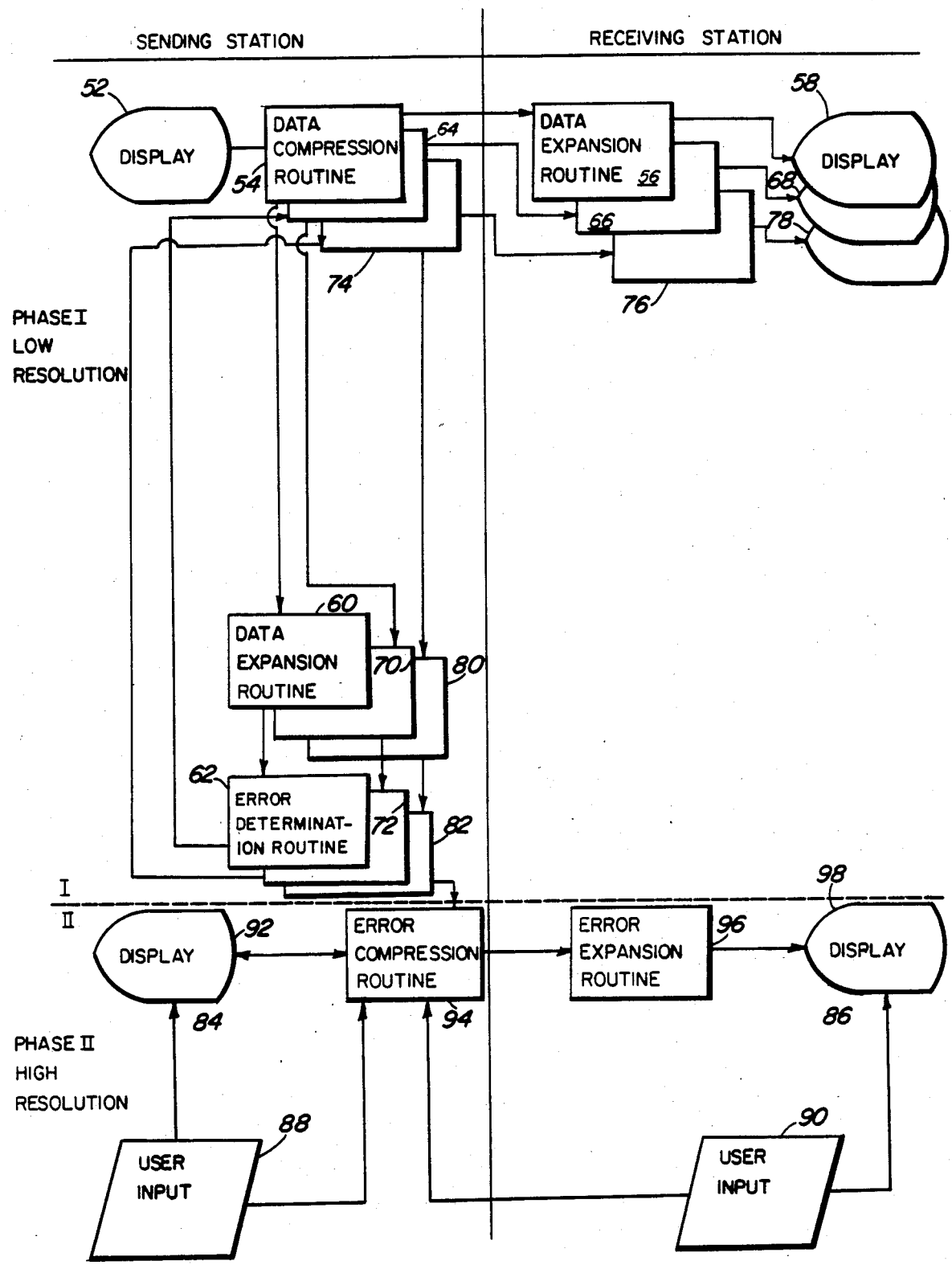

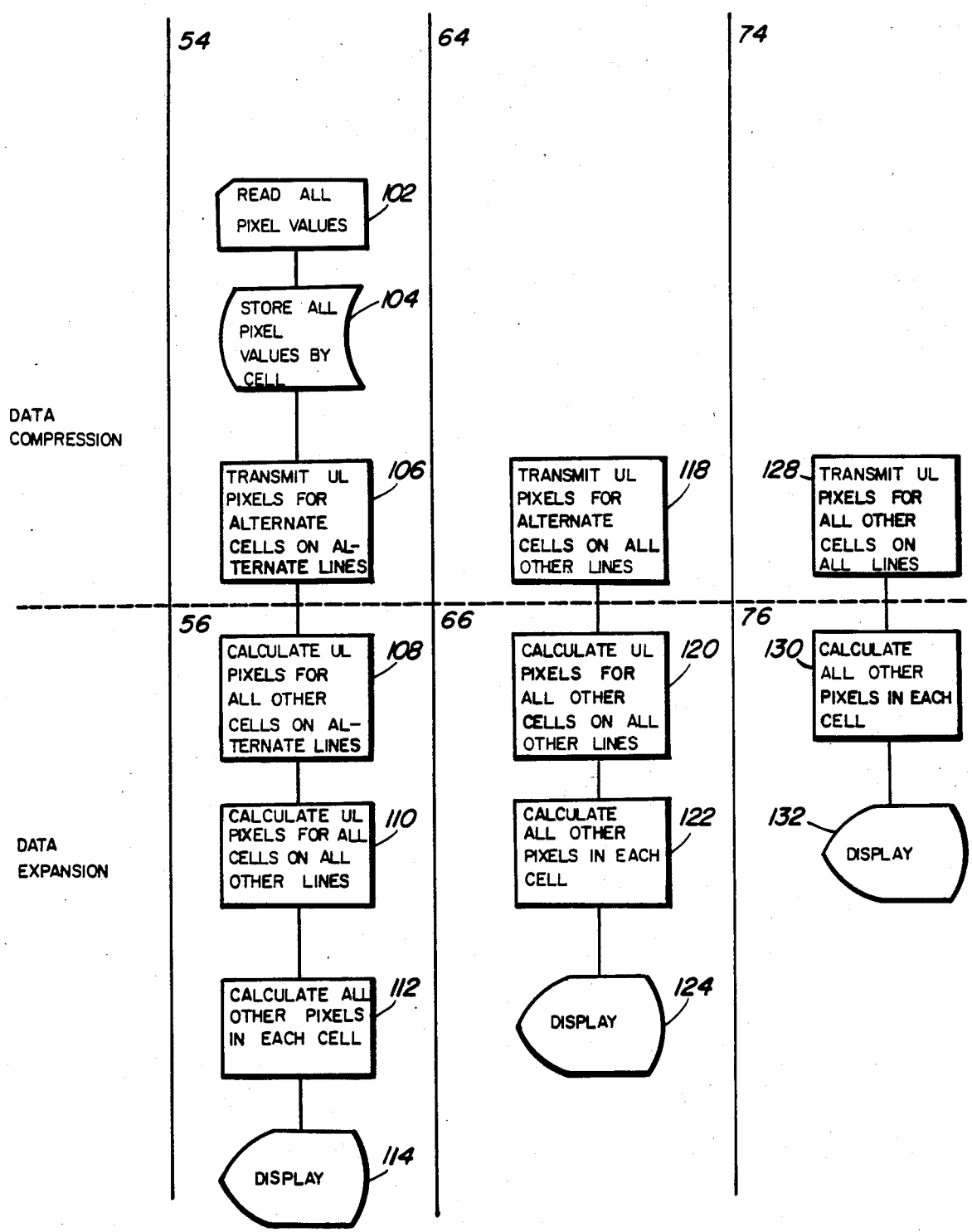

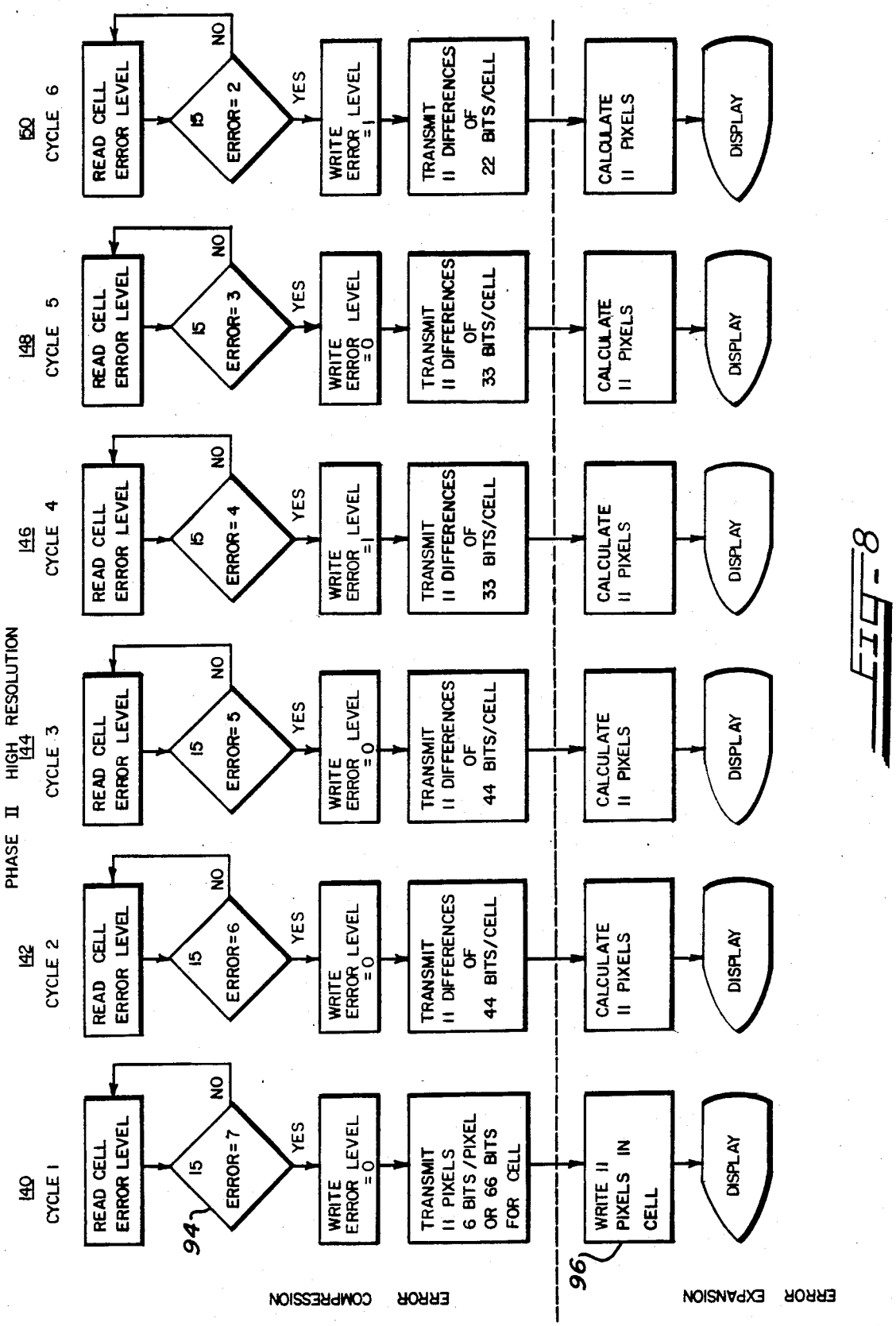

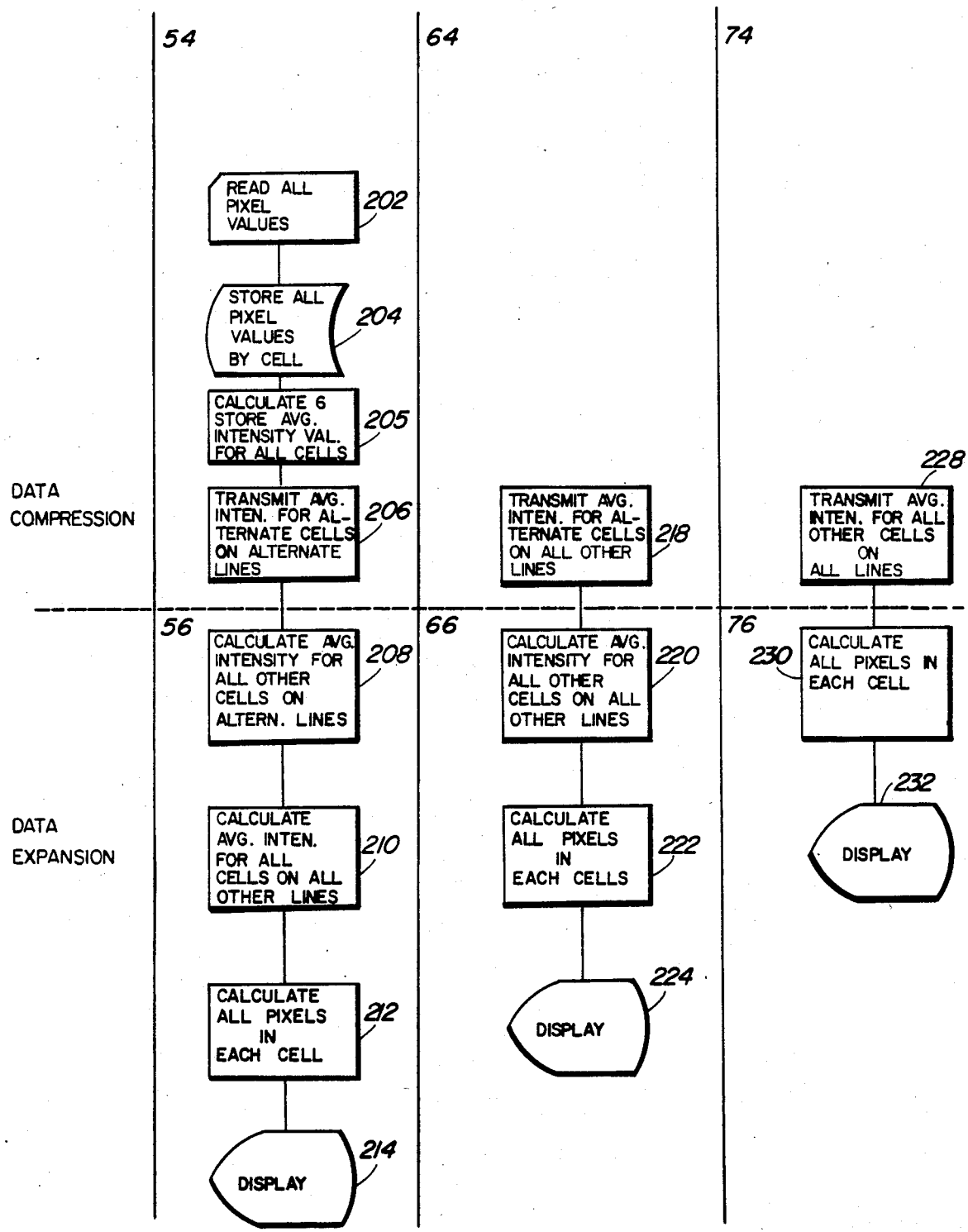

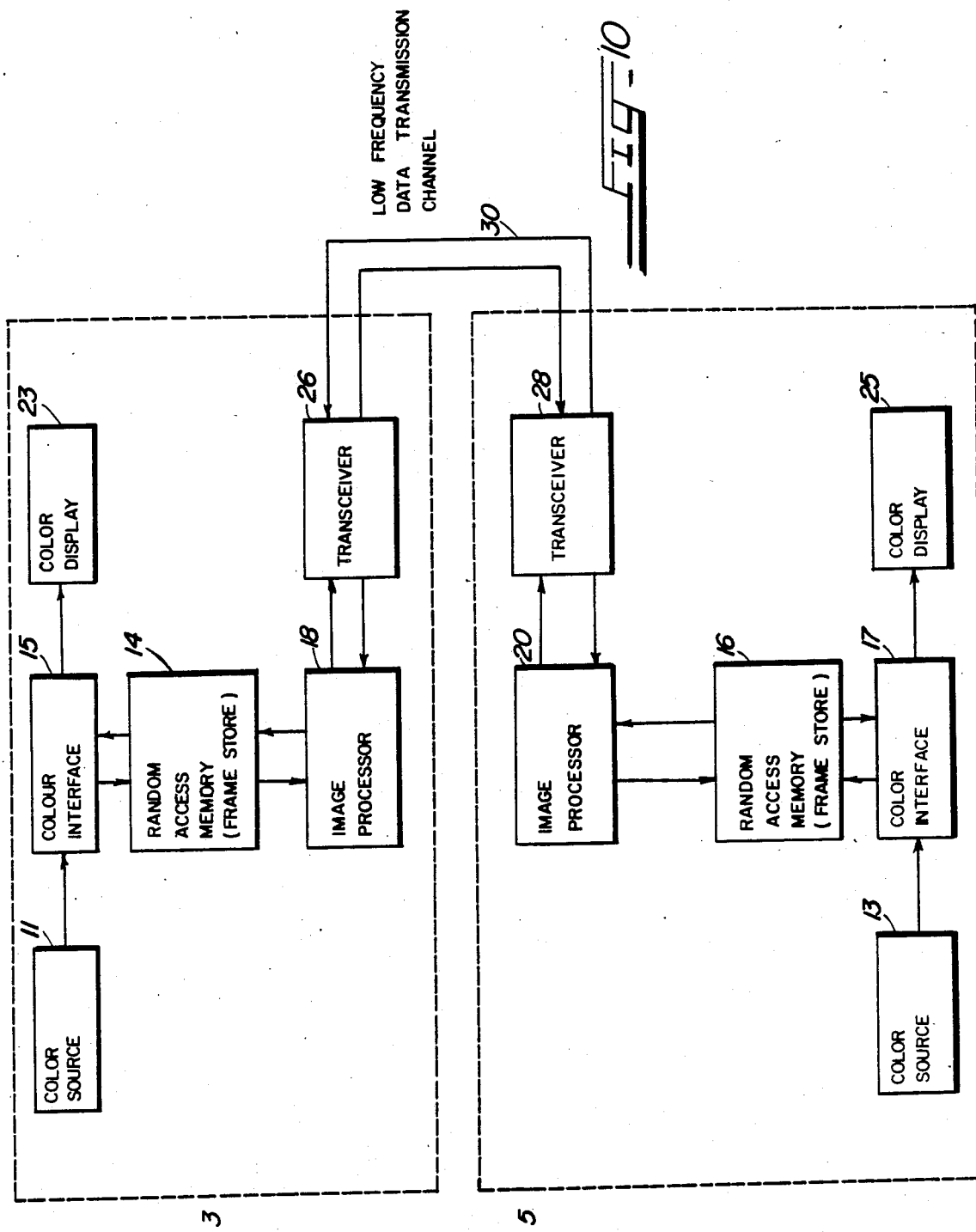

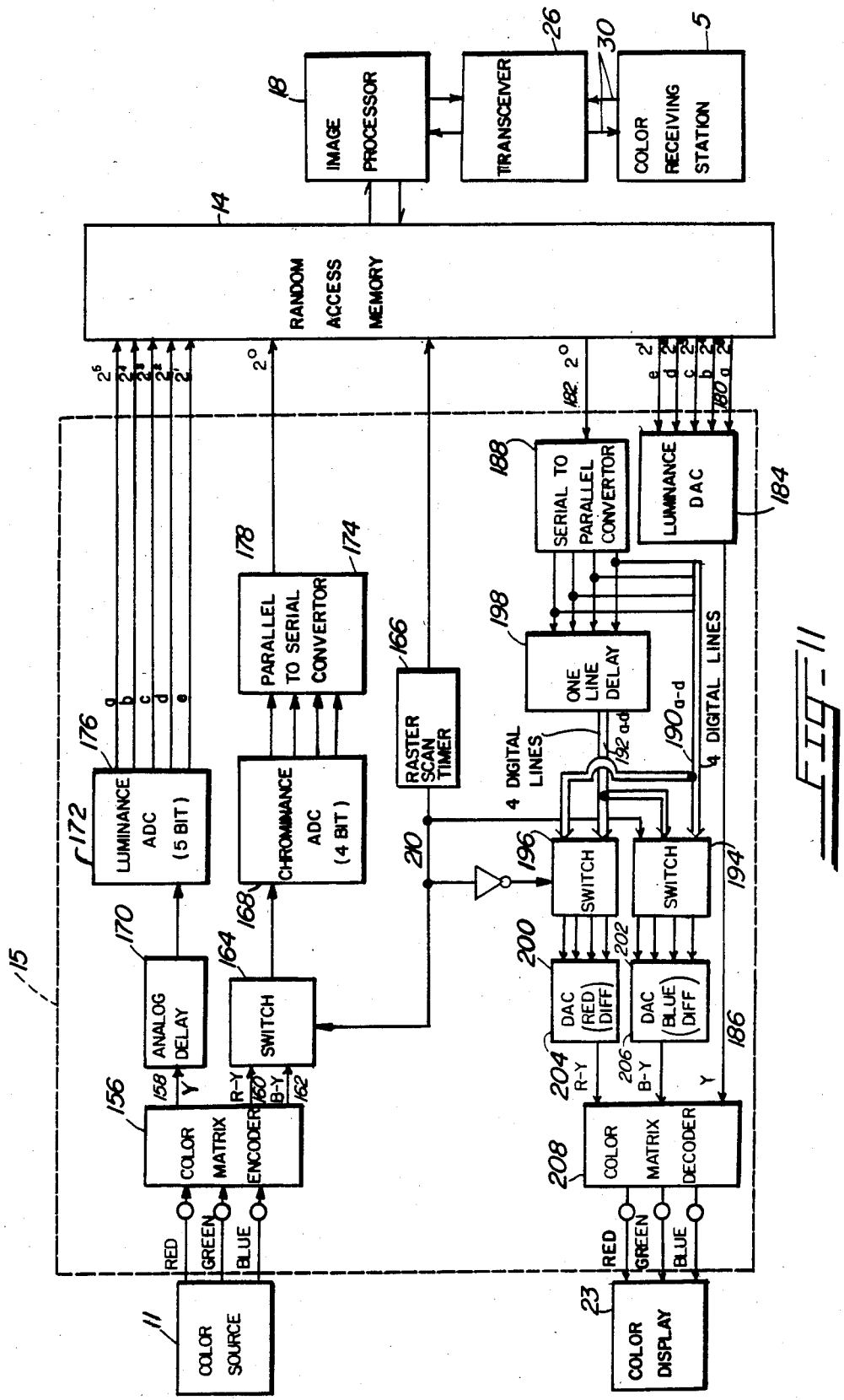

VIDEO COMPRESSION/EXPANSION SYSTEM

BACKGROUND OF THE INVENTION

1. Field of the Invention

This invention relates generally to a broadband data compression/expansion system and more particularly, to an improved system for rapid transmission of black/white and color video images via telephone lines for use in teleconferencing applications.

2. Description of the Prior Art

The rapid transmission, reception, and display by commercial television stations and receivers of quality television images composed of $10^6$ pixels or more with a satisfactory number of gray intensity levels per pixel is commonplace. However, a substantial bandwidth of several megahertz is required for transmission of complete data with respect to the gray-level intensity of each pixel. The cost to obtain this bandwidth is prohibitive for certain business applications like teleconferencing.

It is common in the art to use narrow bandwidth mediums, such as telephone lines, to transmit these television images. However, the television images are necessarily transmitted more slowly over the narrow bandwidth media. Certain techniques were developed to accommodate high data rate sources to narrow band communication channels. These techniques have been integrated into systems which have particular application to the transmission of video information over voice grade communications channels at a data rate that can be accommodated in the limited bandwidth available. Such systems are sometimes called "slow scan" television systems.

It is well known in the art to use slow scan systems for certain applications like security or surveillance where high resolution is not required. In such systems, a frame of 128 pixels by 128 pixels with each pixel being represented by sixteen gray levels can be transmitted in $128 \times 128 \times 4$ bits $= 2^7 \times 2^7 \times 2^2 = 2^{16}$ bits. Such a system is embodied in the Robot Model 530 produced by Robot Research Inc. of San Diego, Calif. However, these systems are capable of only low resolution and cannot process high quality video images of a $480 \times 640$ pixel array with 64 gray levels or $225 \times 2^{13}$ bits. Moreover, such security systems do not posses the ability to automatically improve resolution.

The time necessary for present slow scan systems using current compression schemes to transmit sufficient information for a video presentation of acceptable quality requires in the order of 90 to 120 seconds per display frame at transmission rates of 9600 bits/sec. For example, a normal video picture requires about 2 million bits of information. At the normal rate of transfer of 9,600 bits per second over telephone lines, approximately 200 seconds are required to reassemble a complete video picture of satisfactory quality. This process has proven to be too time consuming for many teleconferencing applications. Therefore, various data compression methodologies were developed in order to reduce the time to transmit an image.

The prior art discloses several attempts to reduce this transmission time by decreasing resolution. For example, the Slow Scan Receiver/Transceiver Model 285C manufactured by Colorado Video, Inc. provides a resolution of 256 lines by 512 lines with 8 bits per pixel. At 9600 bits/second, this device requires 111 seconds to transmit a video image. Another technique is run-length encoding. In run-length encoding, the source image is raster scanned and a message is transmitted containing the value of a particular pixel and the length of the serial run of pixels with that value. However, for certain images, run-length encoding will increase the amount of data to be transmitted. See L. Grim, "Reversible Image Compression" 86–89 (1980) (dissertation).

According to the prior art, it is also possible to dispose of or "throw away" certain less informative bits of data and transmit the remaining data to a receiving station where replacement data is calculated and added back to form a complete picture. This shortens the time to produce a single frame. U.S. Pat. No. 4,222,076, entitled "Progressive Image Transmission"—Knowlton, discloses a method for calculating a $16 \times 16$ matrix to describe the gray level intensity produced by adjoining pixels. However, the technique disclosed requires extensive calculations and exceeds the capabilities of all but the most expensive computers. Moreover, Knowlton does not disclose any means for selectively improving the resolution of a portion of the image.

The data compression/expansion techniques taught in the prior art are generally time consuming and provide only a low resolution capability which is unsuited for graphics video standards requiring high resolution. Noreover, these techniques often require that the sending and receiving stations share the same video standard. It is desired that a teleconferencing system be independent of video standards. Also, while the prior art does disclose certain techniques for automatically updating an output image, the prior art does not teach the use of dynamic external inputs by the viewer to concentrate the resolution power of the invention. For example, it would be desirable for an operator to be able to signal the machine as to the portion of the screen on which the resolution power should be focused. This feature would allow a viewer to determine which of the many portions of a figure are illegible or need further resolution. Those areas could then be designated, thereby permitting greater viewer satisfaction.

The prior art also discloses few uses of color in teleconferencing. The reason is that existing technology requires a total of six million bits of information in order to accommodate red, blue and green images. These six million bits would require up to six hundred seconds to transmit. This is too long a time to be useful in most teleconferencing applications. What is needed to satisfy teleconferencing requirements is a timely means for providing transmission and display of an analog-type color picture using digital data.

It is thus a principal object of the present invention to generate a low resolution video image of sufficient quality to permit immediate review and analysis by viewers.

It is also an object of the invention to provide a means for automatically updating the low resolution image.

It is a further object of the invention to automatically add higher resolution to selected portions of the image.

It is yet another object of the present invention to allow the user to select those portions of the initial image where high resolution will be performed first.

It is yet another object of the present invention to provide an image generated by digital data which resembles an analog output.

It is yet another object of the present invention to allow color as well as black/white images to be communicated rapidly.

It is yet another object of the present invention to permit color and non-color stations to interact.

It is yet another object of the present invention to permit a sending station to communicate with a plurality of receiving stations.

It is yet another object of the present invention to provide a teleconferencing system which is independent of video standards.

SUMMARY OF THE INVENTION

The present invention provides an improved two phase means for rapidly compressing, expanding, and displaying broad band information which is transmitted over a narrow band communications channel. This invention is particularly directed at improving the present means for communicating video images among a plurality of teleconferencing stations over telephone lines.

This invention discloses a means for providing an image in two phases: Low Resolution and High Resolution. During the first phase, a low resolution image is generated and updated according to the results of several cycles of a data compression routine and a subsequent data expansion routine. Resolution is improved during the second High Resolution phase.

Initially an input image is scanned by a raster scanner, converted to digital data, and stored in memory as a display frame. The display frame is structured such that a frame of a video image, generally composed of 640 pixels per line, 480 lines per frame, is divided into cells where each cell contains 12 pixels, 4 pixels horizontally and 3 lines vertically. A gray level with $2^6$ or 64 levels is assigned to each pixel.

In the preferred embodiment, the sending station transmits a gray level value for a single predetermined pixel in certain selected cells during the first cycle in the Low Resolution phase. The receiving station uses these pixel values to calculate the remaining untransmitted pixel values by linear interpolation. As the receiving station calculates the untransmitted pixel values, the station stores the values in RAM. As the pixels are assigned values, a first display is generated. During second and third cycles in this phase, actual values for single predetermined pixels for the remaining cells are transmitted. These values are then used by the receiving station to calculate the remaining untransmitted pixel intensities by linear interpolation.

Higher resolution is then obtained during the second phase by substituting a plurality of pixel values for the previously transmitted single pixel value for those cells having the greatest deviation in intensity values from the input video image according to error determination, compression, and expansion routines.

In an alternative embodiment, the image processor determines the average intensity of each cell that has been previously read by the raster scanner and stored in RAM. The average intensity value for certain selected cells is transmitted by the sending station to a receiving station which expands the transmitted data to fill in values for all remaining cells and pixels, values which are then stored in a memory of the receiving station and displayed. In the second and third cycles, image resolution is improved by replacing calculated cell intensity values with actual cell intensity values and recalculating the values of untransmitted cells and pixels.

During the High Resolution phase, average cell intensity values are replaced by intensity values for selected smaller cells and ultimately, individual pixels, according to an error routine whereby higher resolution data is calculated by the sending image processor and is provided for those cells containing the greatest variation in the intensity of individual pixels.

In an alternative embodiment that does not use the error determination routine to identify initially those areas most in need of higher resolution, any user may exercise dynamic control over higher resolution of any portion of the image by use of manually manipulated controls.

In another alternative embodiment of the present invention, color data is compressed and is transmitted as the least significant bit in the six bit value for intensity. If the receiving station has a color capability, the color data transmitted from the sending station will be separated, expanded and added to the output image at the receiving station. If the receiving station is monochrome, the output image will be monochrome and the random color data contained in the least significant bit will have a negligible effect on the output monochrome image. Also, a color-capable receiving station ignores the least significant bit from a monochrome station and produces an image with 32 instead of 64 levels of gray level sending intensity.

BRIEF DESCRIPTION OF THE DRAWINGS

FIG. 4 is a flow diagram illustrating the phases and routines utilized in the present invention.

FIG. 5 is a flow diagram illustrating the preferred embodiment of the data compression routine and the data expansion routine in the Low Resolution phase.

FIG. 8 is a flow diagram illustrating the preferred embodiment of the error compression routine and the error expansion routine in the high resolution phase.

FIG. 9 is a flow diagram illustrating the alternate embodiment of the data compression routine and the data expansion routine in the Low Resolution phase.

FIG. 10 is a block diagram of an alternative embodiment of the present invention which includes a color interface.

FIG. 11 is a schematic diagram of the color interface at a sending station.

DETAILED DESCRIPTION OF THE PREFERRED EMBODIMENT

Figure 1:
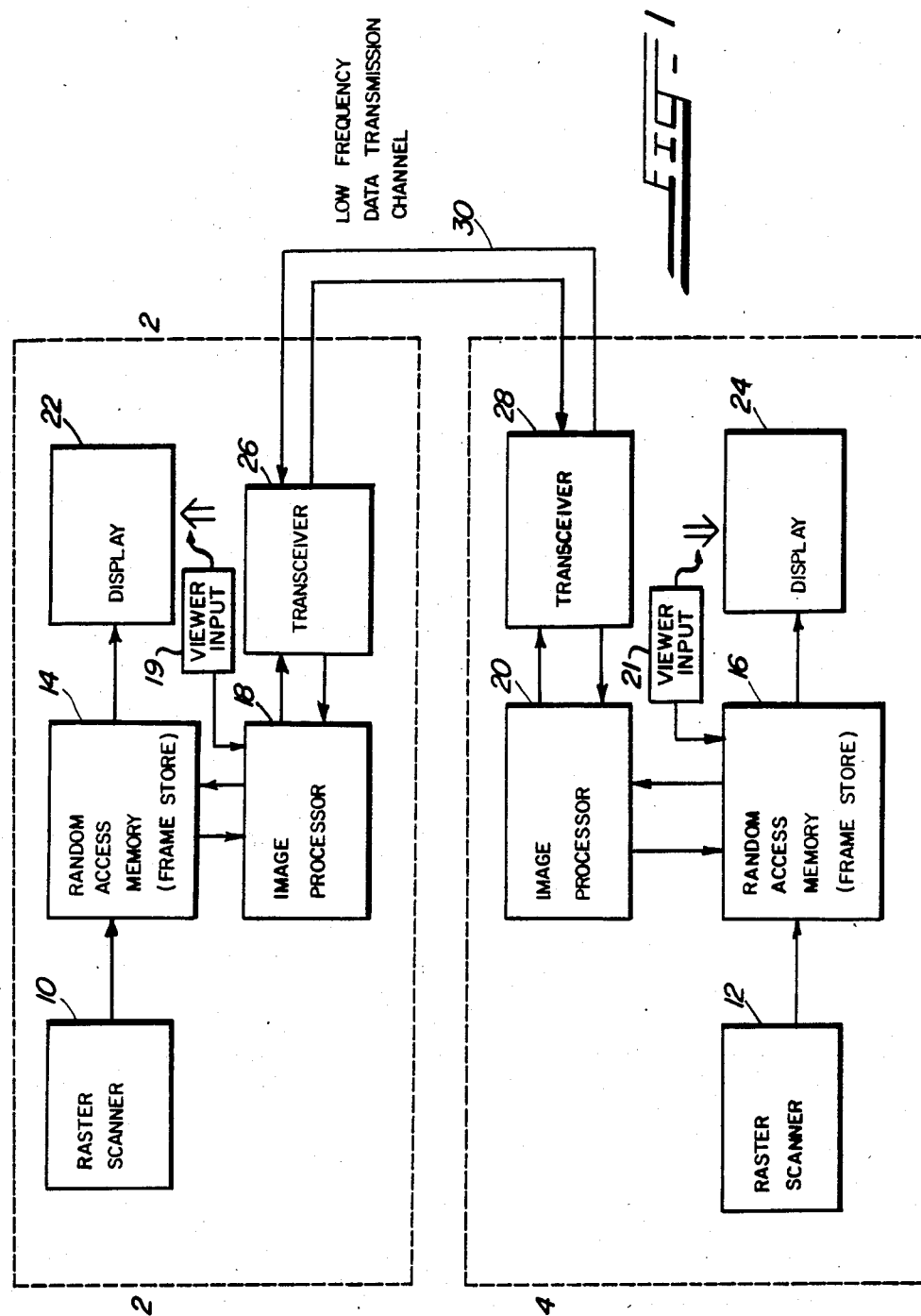
FIG. 1 is a block diagram of the present invention.

FIG. 1 is a block diagram of the present invention. Two stations 2 and 4 each capable of sending and receiving narrow band transmissions are shown. For this discussion, the first station 2 shall be designated the sending station. The second station 4 shall be designated the receiving station. The sending station 2 contains a raster scanner 10, a random access memory 14, an image processor 18, a display device 22 (such as a CRT), a manually manipulated viewer input device 19 and a transceiver 26. The receiving station also contains a raster scanner 12, a random access memory 16, an image processor 20, a display device 24, a manually manipulated viewer input device 21 and a transceiver 28. Each station is connected to other stations via a low frequency data transmission channel 30.

The sending raster scanner 10 assigns digital values to represent the intensity of the image being scanned. Typically, a frame is composed of 640 pixels per line, 480 lines per frame, or a total of $225 \times 2^{13}$ pixels. Each pixel can be assigned one of 64 gray level intensity values, which can be represented in 6 bits.

Figure 2:
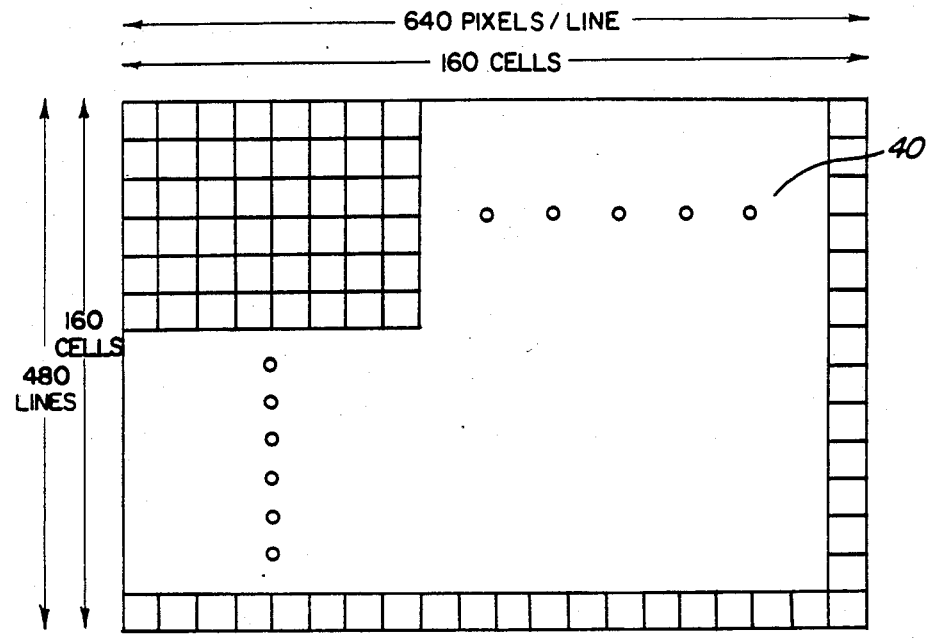
FIG. 2 is a schematic diagram of a single display frame.

The digitized output of the raster scanner 10 is stored in memory 14 according to a predetermined cell structure. FIG. 2 illustrates that structure. A frame 40, stored in memory 14, is divided into cells with an aspect ratio of 4:3.

Figure 3:
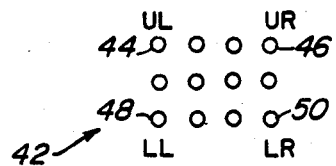
FIG. 3 is a schematic diagram of a single cell.

FIG. 3 illustrates the construction of a single cell 42 with corner pixels designated as UL (upper left) 44, UR (upper right) 46, LL (lower left) 48, and LR (lower right) 50.

FIG. 4 is a flow diagram of the Low Resolution and High Resolution phases and the associated routines utilized in transmitting a final image from the sending station and receiving it at the receiving station.

In Phase I, Low Resolution of the preferred embodiment, the sending station transmits a single six-bit word of data that represents the gray-level intensity value of the UL pixel of selected cells in the display 52. The data transmitted is selected according to a data compression routine 54. Two different data compression routines are described below. The receiving station image processor 20 (see FIG. 1) expands this data by means of a data expansion routine 56 in order to fill remaining cells. Two different data expansion routines are described below. A display 58 is then generated at the receiving station.

While the receiving station image processor 20 is performing the data expansion routine, the sending station image processor 18 is performing data expansion routine 60. The sending station image processor 18 performs this calculation for the execution of the error determination routine as more fully described below.

The sending station then employs error determination routine 62 to determine the difference between the calculated pixel values and the transmitted pixel values for each cell. The errors and the associated cells are prioritized by error magnitude and stored in the sending station memory.

As soon as the sending station 2 has completed an initial cycle of the data compression routine 54, the data expansion routine 60, and error determination routine 62, the sending station begins a second data compression routine 64 and transmits data for additional cells according to additional instructions in the data compression routine. The receiving station 4 uses the data expansion routine 66 to update the display 68. Meanwhile, the sending station 2 executes the data expansion routine 70 and the error determination routine 72 and again stores the results.

The sending station 2 begins the third data compression routine 74 and transmits a value for each of the remaining cells as determined by the data compression routine 74 and the receiving station 4 uses the data expansion routine 76 to update the values of the cells and pixels in the display 78. Meanwhile the sending station 2, executes a final data expansion routine 80 and then a final error determination routine 82.

Following transmission of the final cell values, the sending station 2 enters Phase II, High Resolution, and executes the error compression routine 94.

The errors assigned to each cell and stored in memory by the error determination routines 62, 72 and 82 are examined by the sending station error compression routine 94. Those cells with the greatest errors are compressed first and corrective data are transmitted to the receiving station error expansion routine 96, which expands the data and calculates individual pixel values for all 12 pixels within the cell. A high resolution display 98 is generated by replacing the selected single values for all pixels within each cell with individual pixel values as determined by the error expansion routine 96.

The High Resolution phase of the present invention can also be controlled by viewer input 80 either at the sending station 88 or the receiving station 90 (i.e., via viewer input devices 19 or 21, respectively, of FIG. 1). As disclosed in U.S. patent application No. 3,617,630, entitled "Superimposed Dynamic Television Display System" and co-pending U.S. patent application No. 480,652, entitled "System for Sensing Spatial Coordinates" filed Mar. 31, 1983, both of which are assigned to the assignee of the present invention Interand Corporation, the user may employ a manually movable probe to superimpose a visual image upon a display at the sending station 84 or the receiving station 86. For example, a particular section in the display can be circled with the probe. The receiving and sending stations will then execute the error routine for the circled area first. This image can then be used to prioritize areas of the image which are to be updated first.

In the Low Resolution phase, compression and expansion routines should follow the same methodology. Two different methodologies are presented below. Both have an initial cycle whereby the sending station 2 transmits a six bit code representing the intensity of either the UL pixels or the average intensity of the pixels in alternate cells on alternate lines to the receiving station 4 which in turn employs an expansion routine to fill in the remaining pixels. Two subsequent cycles are then executed to transmit a six bit code representing either the intensity of the UL pixels or the average intensity of the pixels in alternate cells on the skipped lines and then for all remaining cells. In both routines, Phase I involves the transmission of a total of 6 bits of data for $160 \times 160$ cells or 153,600 bits of data in three stages. At a transmission rate of 9600 bits/sec, Phase I consumes about 16 seconds. For clarity, only the preferred embodiment wherein the UL pixel values are transmitted during Phase I will be described in detail.

Figure 6A:
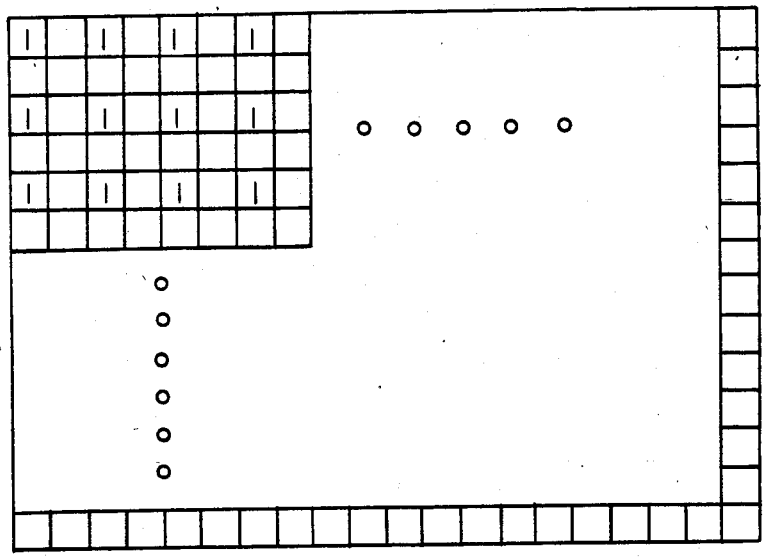
FIG. 6A is a block diagram of a map of the cells with single pixel values transmitted during the first cycle of data compression routine.

In the preferred embodiment of the data compression routine, the sending station image processor 18 transmits the gray level intensity value of the UL pixel of each cell. The receiving station uses the transmitted pixel values to calculate the remaining untransmitted pixel values by linear interpolation. Referring to FIG. 5, during data compression routine 54, the sending station 2 transmits the gray level intensity values for the UL pixels of for alternate cells on alternate lines 106. Those values had been read previously in block 102 and stored in block 104. FIG. 6A illustrates the cells whose UL pixel values are transmitted in the first cycle.

Figure 7:
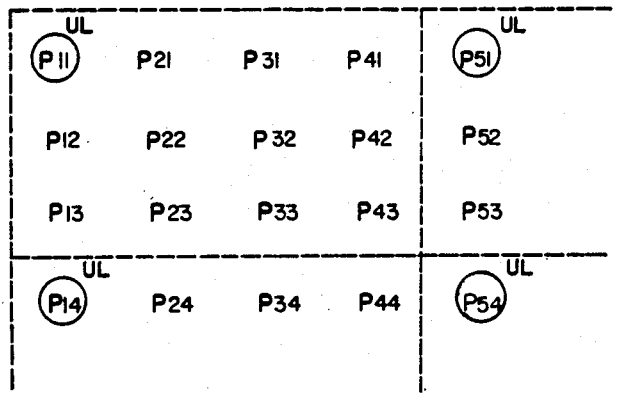
FIG. 7 is a diagram illustrating representative coordinate numbering of the individual pixels in adjacent cells utilized in the determination of untransmitted pixel values within a cell.

The receiving station image processor 20 "fills in" the other incomplete cells according to a data expansion routine 56. FIG. 7 illustrates the coordinate numbering used in execution of the data expansion routine 56 for an untransmitted UL pixel. Pn,m, where Pn−1,m and Pn+1,m represent the transmitted data for UL pixels to the left and right of UL pixel Pn,m.

Referring to FIG. 5, the UL corner pixel of the cells on the partially completed lines is calculated in block 108 by the following formula:

$$P_{n,m} = \frac{Pn - 1,m + Pn + 1,m}{2} \quad [1]$$

The UL corner pixel of all the cells in the untransmitted row of cells is then calculated in block 110 by the following formula:

$$P_{n,m} = \frac{Pn,m - 1 + Pn,m + 1}{2} \quad [2]$$

where Pn,m−1 and Pn,m+1 represent the UL pixel of cells above and below UL pixel Pn,m.

After the UL pixels have been calculated for all cells in a line, the 11 remaining pixels in each cell, as shown in FIG. 7, are calculated in block 112 by the following "nearest neighbor" interpolation.

First, P11, P51, P14, P54 are transmitted or calculated. Next, value for those pixels lying vertically between UL pixels are calculated according to the following formulas:

$$P12 = \frac{2P11 + P14}{3} \quad [3]$$

$$P13 = \frac{P11 + 2P14}{3} \quad [4]$$

$$P52 = \frac{2P51 + P54}{3} \quad [5]$$

$$P53 = \frac{P51 + 2P54}{3} \quad [6]$$

Finally, values for pixels lying horizontally between pixels in the left hand rows of each cell are calculated according to the following formulas:

$$P21 = \frac{3P11 + P51}{4} \quad [7]$$

$$P22 = \frac{3P12 + P52}{4} \quad [8]$$

$$P23 = \frac{3P13 + P53}{4} \quad [9]$$

$$P31 = \frac{P11 + P51}{2} \quad [10]$$

$$P32 = \frac{P12 + P52}{2} \quad [11]$$

$$P33 = \frac{P13 + P53}{2} \quad [12]$$

$$P41 = \frac{P11 + 3P51}{4} \quad [13]$$

$$P42 = \frac{P12 + 3P52}{4} \quad [14]$$

$$P43 = \frac{P13 + 3P53}{4} \quad [15]$$

The result is that the value of alternate cells on alternate lines can be transmitted in about 4 seconds over a 9600 bit/second line. (80 horizontal cells×80 vertical cells×6 bits per cell/9600 bits/sec=4 sec for 9600 bits/sec transmission). As the data expansion routine fills in the remaining cells, a complete image will be produced at the receiving station display 114. The image is continuous in appearance and has enough detail to provide the user with a "starting look" at the image. The image is smooth not "digital" and is far more pleasing and informative than a "digital" image.

Figure 6B:
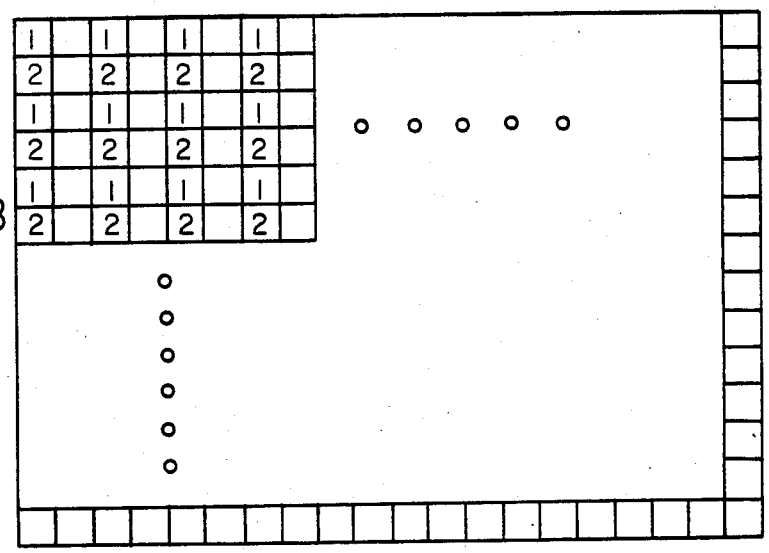
FIG. 6B is a block diagram of a map of the cells with single pixel values transmitted during the first and second cycles.

Referring still to FIG. 5, during data compression routine 64, the sending station transmits the UL value for every other cell in the missing lines 118. FIG. 6B illustrates the cells whose UL pixel values have been transmitted during the first and second cycles.

Once the untransmitted UL pixel values have been recalculated by the receiving station in block 120, the other 11 pixels in each cell are calculated in block 122 for every cell in order to improve resolution and smoothness of the display 124. It should be noted that the same amount data is transmitted in the second cycle as was transmitted in the first cycle.

Figure 6C:
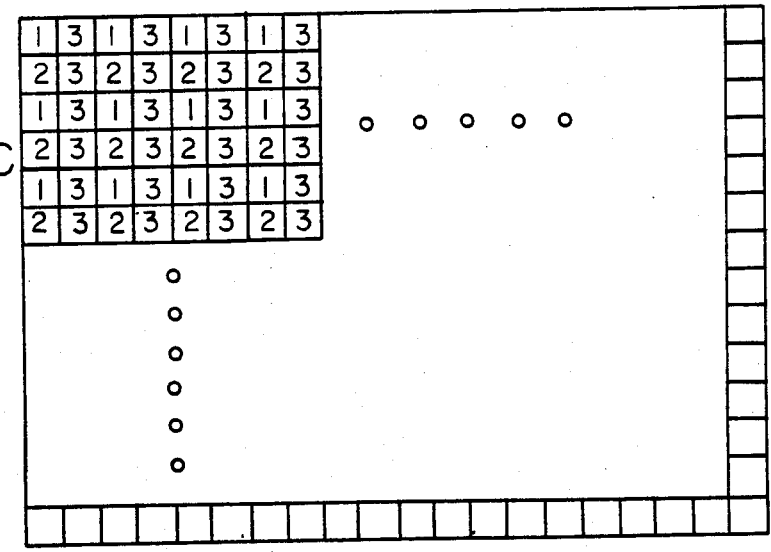
FIG. 6C is a block diagram of the cells with single pixel values transmitted during the first, second, and third cycles.

During data compression routine 74, the UL pixel values of the remaining cells are transmitted 128. FIG. 6C illustrates the cells whose UL pixel values are transmitted during each of the three cycles. All 11 remaining pixels of each cell are once again calculated in block 130 by the data expansion routine and the display 132 is updated. The third cycle requires as much time as the first and second cycles combined.

Following the transmission of the values of the remaining cells, the High Resolution phase is executed. In the preferred embodiment of the error determination routines 62, 72 and 82, the sending station 2 calculates the absolute differences between the UL pixel and each of the remaining 11 pixels in each cell and stores in sending station memory the largest difference for each cell.

These differences, or errors, are prioritized by error magnitude and stored in the sending station memory. In the preferred embodiment, the sending station data expansion and error determination functions are each performed in three routines instead of single routines at the end of the Low Resolution Phase. This enables the computation time of the sending station data expansion and error determination routines to be spread over the three cycles of the Low Resolution Phase instead of inefficiently lumping this computation at the end of the Low Resolution Phase. The errors are utilized in the High Resolution Phase as more fully described below.

Where there are large differences between a transmitted cell value and the individual pixels in that cell, the error routine replaces those single cell values with individual pixel values, beginning with the cell with the largest variation.

The technique of transmitting corrective data for cells with the largest errors first has several advantages. First, the great majority of cells, 80 to 90 percent, have error levels of 1 or 2 and only 10 to 20 percent have larger error values. It is precisely the 10 to 20 percent of those cells that provide needed detail. By transmitting those cells first, the user is able to see detail more quickly.

Referring to Table 1, tests have shown that for most images, less than 10 percent of the cells have errors in excess of 7 levels of intensity out of a possible 64. Consequently, all cells with error levels of 7 or higher are grouped into one group of 7 or higher (see Table 1).

Tests have also shown that reducing the error below a figure of 1 produces little noticeable improvement in the displayed image. Table 1 shows that for error levels of 4, 2 and 1, the number of bits to be transmitted is reduced by permitting an error of +1, +1, and ±1, respectively. An error of 1 indicates that the single intensity value assigned to that cell is within one level of intensity of each pixel in the cell. On a scale of 64 intensity levels, changing a level by 1 has a negligible effect. Because 1 is an acceptable error level, the error compression routine 94 will add a sufficient number of pixels to the cell to ensure that the maximum difference between the last displayed value and any cell pixel is not more than 1 level of intensity.

Table 1 illustrates the number of bits required to be transmitted in order to describe the number of states which will satisfy the possible range of errors.

embodiment which rely on the UL pixel value, the average intensity of each twelve pixel cell is calculated and used in place of the intensity of the UL pixel. Referring to FIG. 9, the average intensity of each cell is determined in block 205 during data compression routine 54. The data expansion routine 56 then calculates cell and individual pixel values in the same manner as described in the preferred embodiment.

The error compression routine 94 and error expansion routine 96 outputs and receives data for 12 pixels rather than for 11 pixels. This increases the time required to execute the High Resolution Phase II. There is however improvement in the visual quality of the image in the alternative embodiment during each of the 3 cycles of phase I and for most images there is a slight reduction in error level for many cells.

It should be pointed out that in either the preferred embodiment, or in the alternative embodiment, the error compression routine 94 and error expansion rou-

TABLE 1

| Error Level | Max. No. of States Needed to Represent Pixel Differences | Bits/Pixel Required to Represent Max No. of States | Bits/Pixel Actually Transmitted To Reduce Error | Max. Error After Correction | Cycle No. in High Resolution Phase, Phase II Cycle |
|---|---|---|---|---|---|
| 7 or higher | 127 | 7 | 6 | 0 | 1 |
| 6 | 13 | 4 | 4 | 0 | 2 |
| 5 | 11 | 4 | 4 | 0 | 3 |
| 4 | 9 | 4 | 3 | 1 | 4 |
| 3 | 7 | 3 | 3 | 0 | 5 |
| 2 | 5 | 3 | 2 | 1 | 6 |
| 1 | 3 | 2 | — | ±1 | — |
| 0 | 1 | 1 | — | 0 | — |

Referring to FIG. 8, the error compression routine 94 is executed in 6 cycles, beginning with the largest errors and finishing with those cells having the lowest errors. In the first cycle 140, the actual 6 bit value of the remaining 11 pixels in the cell are transmitted for cells with an error level equal to 7 or higher. In cycle 2 142 and cycle 3 144, only 4 bits/pixel are transmitted in order to absolutely define the 11 remaining pixels in the cell for cells with errors equal to 6 or 5. In cycle 4 146, 4 bits/pixel are required to describe the 9 possible error values (−4 to 0 to +4). However, assuming that errors of +1 are negligible, the number of states can be reduced to 8 which permits the use of 3 bits/ pixel to define the remaining pixels. Reducing the number of bits to be transferred saves time, especially because a larger number of error values can be expected at the lower error levels. In cycle 5 148, cells with errors equal to 3 are transmitted with 3 bits/ pixel to absolutely define all pixes in those cells. In cycle 6 150, a maximum error of 1 is permitted in order to permit cells with errors equal to 2 to be transmitted with 2 bits/ pixel. Finally, cells with error levels of 1 are omitted because tests show they add little detail to the final image and cells with errors of 0 need not be transmitted.

The error compression routine 94 must also output a cell location in addition to the cell correction data. This is achieved by including a variable length jump code as a header to the correction data for each cell. The code is interpreted by the error expansion routine 96 to indicate the horizontal and vertical displacement of the cell from the previous corrected cell. The jump code adds an average of only 10 percent more data to the error compression routine 94 output data, and hence increases transmission time by 10 percent.

In an alternative embodiment to the data compression, data expansion, and error routines of the preferred tine 96 need not output or receive data for all pixels within a cell. The error expansion routine 94 may output data for one third or one half of the pixels in a cell in order to further reduce the amount of data required to improve the cell. The error expansion routine 96 will correct the pixels defined by the error compression routine 95 and then calculate the intensity values of the remaining pixels by interpolation. This results in a significant decrease in transmission time, but increases the calculations required at the receiving station.

It is a unique aspect of the invention that the sending station 2 and the receiving station 4 are video standards independent. That is the sending station 2 may operate and output to displays which are a different video standard than the receiving station 4. The video standard applies only to the manner in which the sending station random access memory 14 and receiving station random access memory 16 are raster scanned for the display 22, 24. The raster scan of the random access memories 14, 16 or the encoding of a video input to memories 14, 16 in no way affects any of the above mentioned compression/expansion routines. Thus, the sending station 2 may reside in the USA and operate on a 525 line/60 HZ standard and the receiving station may reside in Europe and operate on a 625 line/50 HZ standard and vice-versa. Furthermore, as will be shown below, it is also a unique aspect of the invention that sending and receiving stations may be monochrome or color and that color stations are also standard independent.

In an alternative embodiment of the present invention, color information can be compressed and expanded by a color interface 15 at the sending station 3 and a color interface 17 at the receiving station 5 as shown in FIG. 10. The color system shown in FIG. 11 could be present in a sending station, a receiving station or both. Only when it is present in both stations will the receiving station be capable of producing a color display. It will be evident from the detailed description below, sending station 3 utilizes both the color transmission and color reception capabilities of this embodiment. The receiving station 5 utilizes only the color reception capabilities. For clarity, the color reception capabilities will be described as part of the color sending station 3. It should be obvious however that the color reception capabilities of the receiving station 5 will mirror those of the color sending station 3.

The preferred embodiment discloses the use of six bits of data to represent 64 levels of gray level intensity. In order to add a color capability, the sixth or the least significant bit is used to store color data. It should be noted that the color embodiment described below incorporates all the features of the preferred monochrome embodiment described above.

While representing color in a single bit plane is low resolution compared to black and white information which uses five bits, tests have shown that the reduction of one bit plane in high resolution monochrome systems degrades the system very little. The human eye has far greater sensitivity to the luminance portion of an image (bits one through five) than to the chromonance portion of the image (bit six).

Referring to FIG. 11, it is well known in the art to compress the red 150, green 152 and blue 154 inputs of a color input source 11 by forming a luminance signal Y 158 and two color difference signals R-Y 160 and B-Y 162 by means of a color matrix encoder 156.

The luminance signal Y 158 is found as follows:

$$Y = 0.59G + 0.30R + 0.11B \qquad [16]$$

It is evident that the luminance signal is the monochrome or black and white video signal. When there is no chrominance that is, when $G=R=B$, $R-Y$ and $B-Y=0$.

The first stage of color compression occurs when a switch 164 controlled by the raster scan timer 166 passes either the red color difference signal R-Y 160 or the blue color difference signal B-Y 162 to the chrominance analog to digital convertor (ADC) 168. Switch 164 is an alternate line switch which alternately passes either the red difference or the blue difference signal for a particular scan line.

The chrominance ADC 168 digitizes the analog output of switch 164 to four bits or 16 levels of intensity. The parallel outputs of the chrominance ADC 168 is rearranged to a serial output by the parallel to serial convertor 174.

While the encoded red and blue difference signals 160, 162 are being routed to the switch 164, the luminance signal Y 158 is passed through an 8 pixel analog delay 170 and input to the luminance analog to digital convertor (ADC) 172. The luminance ADC 172 converts the intensity of each of the 640 samples contained on a horizontal line into a 5 bit value signifying 32 levels of greyscale intensity. The luminance signal Y 158 is digitized at high resolution, i.e., 640 pixels/ line, 480 lines/frame, 5 bits/pixel.

An additional color compression occurs when the chrominance ADC 168 digitizes the output of the switch 164. The chrominance ADC 168 operates at ¼ the sampling frequency of the luminance ADC 172. The chrominance ADC 168 produces 160 color difference samples per line as opposed to 640 samples per line for the luminance ADC 172. The output of the chrominance ADC 168 then passes to a parallel to serial convertor 174 which serializes the 4 parallel color bits to one serial output 178. The result is that 160 samples with an associated 4 bit chrominance value are converted into 640 serial bits per line and is stored in a single bit plane in the random access memory 14. The serial output 178 of the convertor 174 has 640 bits per scan line and is synchronized as $2^0$ with the 640 pixels of 5 bits of data per line, $2^1$-$2^5$. The 5 bits of data, $2^1$-$2^5$, which are output by the luminance ADC 172, are transferred from the sending station color interface 15 via lines 176 a–e and are stored as the 5 most significant bits in the sending station random access memory 14.

The contents of the sending station random access memory 14 are communicated by a sending station image processor 18 and transceiver 26 to a monochrome or color receiving station 4 or, 5, respectively. In addition to communicating the contents of the sending station random access memory 14 to a receiving station, the color sending station 3 also uses the color data stored in memory 14 to produce a sending station color display 33. The description below describes the production of a color display 23 with respect to the sending station 3. However, it should be evident that the receiving station color display 25 is produced in the same manner from the color data transmitted by the color sending station 3 and stored in the receiving station random access memory 16. If the receiving station 5 did not have a color interface 17 and hence was a monochrome receiving station 4, the monochrome receiving station's output would be negligibly affected by the color difference data. Also, if a monochrome sending station 2 transmits to a color receiving station 5, the color receiving station 5 will store a zero code in the least significant bit plane. Because there is no color difference data stored in the color receiving station random access memory 16, the final output of the color receiving station 5, as seen on the color display 25, is monochrome.

Referring to FIG. 11, the 5 most significant bits $2^1$-$2^5$ are output on lines 180 a–e from the random access memory 14 to a 5 bit luminance DAC 184 where the analog luminance signal Y is output on line 186. The least significant bit $2^0$ passes along line 182 to a serial to parallel convertor 188.

The output of convertor 188 is provided directly to switch 194 by lines 190a–d and also provided to switch 196 by lins 192a–d. The output of convertor 188 is also directed to the one line delay 198. The delay 198 has the ability to store the four bit chrominance values for an entire line. Total storage is thus 640 bits. When a new line is directed from the convertor 188 to the delay 198, the delay 198 outputs the stored chrominance values for the previous line along lines 192 a–d to switch 194 and switch 196. If the initial color difference chosen by the raster scan timer 166 and switch 164 was the red difference signal, the delay would store the red difference values, R-Y 160, for that line until the values for the next line B-Y 162, were output to the delay 198 by the convertor 188.

Switch 194 and switch 196 are controlled by the raster scan timer 166. The output 210 of the raster scan timer alternates between a high or low signal every 63.5 microseconds. These switches 194, 196 alternately pass the output of the one line delay 198 or the output of the serial to parallel convertor 188. In the high state, switch 196 passes the signals on lines 190a–d. In the low state, switch 196 passes the signal on lines 192a–d. By alternating between these two inputs, each switch passes only one type of color difference signal, R-Y or B-Y. The digital outputs from switches 194, 196 are subsequently converted to analog R-Y and B-Y color difference signals by a red difference DAC 200 and a blue difference DAC 202. The luminance signal Y 186, and the color difference signals R-Y 204 and B-Y 206 then pass to the color matrix decoder circuit 208 which forms the red 210, green 212 and blue 214 video outputs according to the following formulas:

$$\text{Red} = (R - Y) + Y$$

$$\text{Blue} = (B - Y) + Y$$

$$\text{Green} = Y - \frac{0.3}{0.59}(R - Y) - \frac{0.11}{0.59}(B - Y)$$

The values are subsequently output to the sending station color display 23. As noted above, the receiving station mirrors the sending station and produces a similar output on the receiving station color display 25.

The least significant bit plane in color systems holds the color data. In the data expansion routines 60, 70, 80 and in the error compression routine 94 discussed earlier, some of the color bits were transmitted. The only cells with possible undefined color bits are for cycles 4 and 6 and for those cells whose error level equalled 1. To complete the final color transmission, it is necessary only to update those cells which still have errors.

In an alternative embodiment, the color data is interleaved with the monochrome transmission by transmitting first the most significant color bit, then the next most significant bit and so on.

It is another unique aspect that the color transmission capability of any particular teleconferencing station can fully interact with any non-color station and vice-versa. Therefore, when a color station transmits to a non-color station, the non-color station disregards the sixth bit of information, the color information. Likewise, when a black and white station transmits to a color station, the color station receives a code indicating that the subsequent transmission in monochrome. The color receiving station then processes only five bits of information and therefore displays monochrome, not color, image.

The capability of the present invention can be greatly expanded by improved microprocessor technology. At present, an Intel Corporation 8085 microprocessor is used. As larger microprocessors become available, the image processing will be further improved. For example, the 8085 microprocessor requires about two seconds to write in the two million bits in the screen. Larger microprocessors process data much faster. Thus, processing time is less critical. The present sixteen seconds necessary to update an image would be reduced significantly if cell size were quadrupled from the present four by three cell to an eight by six cell.

Another aspect of the present invention is that it permits a viewer at the receiving station to determine within four seconds if the picture is the correct one. In other words, a viewer may determine from the initial four second picture that the camera should be shifted right or left or to another item. It should be noted that the receiving station contains a serial buffer to temporarily store and delay the initial generation of the receive station display. This permits the receiving station to output the first cycle of low resolution Phase I to the display in less than 4 seconds it takes for the transmission to reach the receiving station over a transmission line with a capacity of 9600 bits/second. Consequently, although a viewer at the receive station must wait at least four seconds to see the entire first cycle of Phase I, the viewer sees the entire image appear on the receiving station display in two seconds or less. This causes the viewer to believe that the transmission requires less time than it actually does.

It is a further point of the invention that the sequence of sending data is not important. For example, the color map may be sent first and error information updated next.

It is a further point of the invention that a viewer may use manual controls to select those areas in which color resolution, like monochrome resolution, is to be increased. It should be clear that a sending station can transmit data to a plurality of receiving stations where the receiving stations and the sending stations operating at different image input standards and may be either color or monochrome stations. Furthermore, all stations can serve as either sending stations or receiving stations interchangably.

Obviously applications of the present invention are in the areas of medicine, teleconferencing, and surveillance. In medicine, this technique can be used to tag certain areas of X-rays where additional detail is required. For example, a doctor who is viewing a image may desire that certain areas be increased in resolution in order to highlight certain figures.

Further, it should be apparent that various changes, alterations, and modifications may be made to the embodiments illustrated and described herein without departing from the spirit and scope of the present invention as defined in the appended claims.

We claim:

1. A system for the transmission of broad band information over a narrow band transmission medium comprising a sending station and a receiving station, wherein each of the sending and receiving stations comprises means for compressing broad band information in a low resolution phase of at least one cycle; means for generating error codes for the compressed broad band information in a high resolution phase; means for transmitting the compressed broad band information and the error codes over the narrow band transmission medium; means for receiving compressed broad band information and error codes from the narrow band transmission medium; means for expanding the received compressed broad band information; means for updating the compressed and subsequently expanded broad band information in response to the received error codes; and means for display the compressed and subsequently expanded broad band information and the updated broad band information.

2. The system as claimed in claim 1 wherein the means for expanding the received compressed broad band information expands the received compressed broad band information in accordance with an expansion routine, and wherein a display is produced on the means for displaying, whereby said display of the broad band information appears to a viewer to be continuous in the low resolution phase and in the high resolution phase.

3. The system as claimed in claim 1 wherein said broad band information is provided by a video source.

4. The system as claimed in claim 1 wherein said narrow band transmission medium is a voice grade communications system.

5. The system as claimed in claim 1 comprising a plurality of sending stations and receiving stations.

6. The system as claimed in claim 5 wherein;
said sending station is capable of serving as said receiving station; and
said receiving station is capable of serving as said sending station.

7. The system as claimed in claim 5 wherein the broad band information is an image which is comprised of a predetermined number of pixels, and wherein the means for compressing the broad band information comprises:
scanner means for establishing the digital gray level values of the individual pixels in the image;
logic means for grouping said pixels into a plurality of cells;
first memory means for storing said digital gray level values of said pixels;
decision means for compressing the broad band information by selecting and transmitting at least one pixel of a predetermined number of the cells;
and wherein the means for expanding the received compressed broad band information comprises:
calculation means for calculating approximate values for the untransmitted pixels of the image; and
second memory means for storing the gray level values of the transmitted pixels and the approximate values for the untransmitted pixels.

8. The system for transmission of broad band information as claimed in claim 7 wherein said digital gray level values for each pixel is defined in 64 levels.

9. The system as claimed in claim 5 wherein said sending station can communicate with a plurality of said receiving stations.

10. The system as claimed in claim 3 wherein operation of said receiving station is independent of the video standards of the video source at the sending station.

11. A method for transmitting broad band information comprising a low resolution phase of at least one cycle and a high resolution phase where error codes derived during the low resolution phase are transmitted to increase the resolution.

12. The method as claimed in claim 11 wherein the low resolution phase comprises:
compressing the broad band information according to a data compression routine;
transmitting the results of said data compression routine to a receiving station;
expanding said compressed data according to a sending station data expansion routine;
determining errors in said compressed data according to an error determination routine;
expanding said compressed data according to a receiving station data expansion routine;
displaying said receiving station expanded data.

13. The method as claimed in claim 11 wherein the high resolution phase comprises:
compressing the results of said low resolution phase according to an error compression routine;
transmitting the results of said error compression routine;
expanding the results of said error compression routine according to an error expansion routine;
displaying the results of said error expansion routine.

14. The method as claimed in claim 12, wherein the broad band information is comprised of lines of cells and wherein each cell of each line is comprised of pixels, and wherein said sending station cyclically transmits to said receiving station the results of the data compression routine, and wherein the results of the data compression routine are gray level reference values for predetermined cells.

15. The method as claimed in claim 14 wherein reference values for alternate cells on alternate lines are transmitted during an initial cycle of the low resolution phase.

16. The method as claimed in claim 14 wherein said transmitted reference values are the values for a predetermined pixel in each cell.

17. The method as claimed in claim 12 wherein the broad band information is comprised of lines of cells and wherein each cell of each line is comprised of pixels, and wherein the results of the data compression routine are gray level values representing the average intensity of a plurality of pixels in predetermined cells.

18. The method as claimed in claim 14 and wherein the sending station data expansion routine comprises cyclically calculating gray level values for pixels not transmitted.

19. The method as claimed in claim 18 wherein the receiving station data expansion routine comprises cyclically calculating gray level values for pixels not transmitted.

20. The method as claimed in claim 18 wherein said calculation is a linear interpolation.

21. The method as claimed in claim 12 wherein the broad band information is comprised of lines of cells and wherein each cell of each line is comprised of pixels, and wherein the error determination routine comprises calculating the difference between actual pixel values and the results of the receiving station data expansion routine in a plurality of cycles.

22. The method as claimed in claim 13 wherein the broad band information is comprised of lines of cells and wherein each cell of each line is comprised of pixels, and wherein results of the error compression routine of the cells with the greatest error levels are transmitted in a plurality of cycles prior to the results of the error compression routine of the cells with lesser error levels.

23. The method as claimed in claim 22 wherein the transmitted results of the error compression routine approximate the error levels of selected pixels in said cell.

24. The method as claimed in claim 22 wherein values for individual pixels are calculated in a plurality of cycles.

25. The system as claimed in claim 1 further comprising means for responding to resolution control signals, wherein the resolution control signals identify a portion of the broad band information, wherein the error codes corresponding to the portion of the broad band information identified by the resolution control signals are transmitted prior to the error codes not identified by the resolution control signals wherein the sequence of the high resolution phase of said displays of the displaying means can be selected by manual control.

26. The system as claimed in claim 1 further comprising means to provide a color display.

27. The system as claimed in claim 26 wherein the broad band information is comprised of chrominance data and monochrome data.

28. The system as claimed in claim 26 wherein the broad band information comprises a plurality of pixels;

and wherein the pixels comprise chrominance data and luminance data, and wherein said chrominance data is compressed and transmitted as a single digital bit along with a plurality of luminance digital bits for each pixel.

29. The system as claimed in claim 26 wherein said chrominance data is represented by red difference and blue difference values.

30. The system as claimed in claim 29 wherein portions of said chrominance data can be selectively stored in memory as the difference values.

31. The system as claimed in claim 29 wherein said difference values are calculated for a plurality of near neighbor pixels on each line.

32. The system as claimed in claim 29 wherein said difference values are defined in 16 levels of intensity.

33. The system as claimed in claim 26 wherein a color sending station can produce a monochrome display at a monochrome receiving station.

34. The system as claimed in claim 26 wherein a monochrome sending station can produce a monochrome display at a color receiving station.

35. The system as claimed in claim 26 wherein each line of said display contains a red, blue, and green signal.

36. The system as claimed in claim 29 wherein said difference values are stored in a distributed fashion among near neighbor pixels.

37. The system as claimed in claim 26 wherein a sending color station or a receiving color station comprises:
color scanner means for establishing the values of individual pixels in an image;
logic means for grouping said pixels into a plurality of cells;
memory means for storing said values of the pixels;
decision means for coordinating the compression, transmission, and expansion of said values;

38. The system as claimed in claim 32 wherein each of said difference values is transmitted serially.

39. A method for transmitting broad band information over a narrow band transmission medium, comprising the steps of:
digitizing the broad band information into a plurality of digital words, wherein each digital word consists of a predetermined number of digital bits of information;
dividing the digitized broad band information into a plurality of cells, wherein each cell consists of a predetermined number of digital words;
deriving a reference cell value for each cell, wherein each reference cell value is derived from the digital words within that cell;
generating a low resolution representation of the broad band information, comprising the steps of:
transmitting a set of reference cell values over the narrow band transmission medium, wherein the set of reference cell values comprises the reference cell values from each of a preselected set of cells;
receiving the set of reference cell values from the narrow band transmission medium;
expanding the received set of reference cell values to obtain a set of approximated digital words, wherein the set of approximated digital words consists of approximated digital words for all digital words for all cells;
display information derived from the set of approximated digital words, whereby a low resolution representation of the broad band information is obtained.

40. The method of claim 39 wherein the step of generating a low resolution representation of the broad band information is repeated a plurality of times, whereby a plurality of low resolution representations of the broad band information is obtained.

41. The method of claim 39 further comprising the steps of:
computing error codes for all approximated digital words, wherein the error code for a particular digital word reflects the difference between the actual value of that digital word and the value of the corresponding approximated digital word of the set of approximated digital words;
transmitting the error codes over the narrow band transmission medium;
receiving the error codes from the narrow band transmission medium;
updating each of the approximated digital words with the error code that corresponds to each of the approximated digital words; and
displaying information derived from the updated approximated digital words, whereby a high resolution representation of the broad band information is obtained, wherein the high resolution representation of the broad band information is of higher resolution than the low resolution representation of the broad band information.

42. The method of claim 40 further comprising the steps of:
computing error codes for all approximated digital words, wherein the error code for a particular digital word reflects the difference between the actual value of that digital word and the value of the corresponding approximated digital word of the last obtained set of approximated digital words;
transmitting the error codes over the narrow band transmission medium;
receiving the error codes from the narrow band transmission medium;
updating each of the approximated digital words with the error code that corresponds to each of the approximated digital words; and
displaying information derived from the updated approximated digital words, whereby a high resolution representation of the broad band information is obtained, wherein the high resolution representation of the broad band information is of higher resolution than the low resolution representations of the broad band information.

43. The method of claims 41 or 42 wherein the error codes are transmitted in order of decreasing magnitude, whereby the approximated digital words are updated and displayed in order of decreasing magnitude of the corresponding error codes.

44. The method of claims 41 or 42 further comprising the step of responding to resolution control signals, wherein the resolution control signals identify a plurality of digital words, wherein the error codes of the digital words identified by the resolution control signals are transmitted prior to the error codes of the digital words not identified by the resolution control signals.

45. The method of claims 41 or 42 wherein the error codes are of variable length, and wherein the length of the error codes is determined by the magnitude of the error code.

46. The method of claims 41 or 42 wherein each of the error codes is associated with a location code that identifies the digital word to which the associated error code corresponds.

47. The method of claims 41 or 42 wherein the high resolution representation of the broad band information is color information.

48. The method of claims 41 or 42 wherein the least significant bit of each of the digital words contains color information, and wherein the high resolution representation of the broad band information is color information.

49. The method of claims 41 or 42 wherein the least significant bit of each of the digital words contains color information, and wherein the high resolution representation of the broad band information is monochrome information.

50. The method of claims 41 or 42 wherein the high resolution representation of the broad band information is monochrome information.

51. The method of claims 41 or 42 wherein the least significant bit of each of the digital words contains monochrome information, and wherein the high resolution representation of the broad band information is monochrome information.

52. An apparatus for transmitting broad band information over a narrow band transmission medium, comprising:
    means for digitizing the broad band information into a plurality of digital words, wherein each digital word consists of a predetermined number of digital bits of information;
    means for dividing the digitized broad band information into a plurality of cells, wherein each cell consists of a predetermined number of the digital words;
    means for deriving a reference cell value for each cell, wherein each reference cell value is derived from the digital words within that cell;
    means for generating a low resolution representation of the broad band information, comprising:
        means at one station for transmitting a set of reference cell values over the narrow band transmission medium, wherein the set of reference cell values comprises the reference cell values from each of a preselected set of cells;
        means at another station for receiving the set of reference cell values from the narrow band transmission medium;
        means for expanding the received set of reference cell values to obtain a set of approximated digital words, wherein the set of approximated digital words consists of approximated digital words for all digital words for all cells;
        means for displaying information derived from the set of approximated digital words, whereby a low resolution representation of the broad band information is obtained.

53. The apparatus of claim 52 wherein the means for generating a low resolution representation of the broad band information further comprises means for generating a plurality of low resolution representations of the broad band information.

54. The apparatus of claim 52 further comprising:
    means for computing error codes for all approximated digital words, wherein the error code for a particular digital word reflects the difference between the actual value of that digital word and the value of the corresponding approximated digital word of the set of approximated digital words; wherein
    said means for transmitting also transmits the error codes over the narrow band transmission medium;
    said means for receiving also receives the error codes from the narrow band transmission medium;
    means for updating each of the approximated digital words with the error code that corresponds to each of the approximated digital words; and
    said means for displaying also displays information derived from the updated approximated digital words, whereby a high resolution representation of the broad band information is obtained, wherein the high resolution representation of the broad band information is of higher resolution than the low resolution representation of the broad band information.

55. The apparatus of claim 53 further comprising:
    means for computing error codes for all approximated digital words, wherein the error code for a particular digital word reflects the difference between the actual value of that digital word and the value of the corresponding approximated digital word of the last obtained set of approximated digital words; wherein
    said means for transmitting also transmits the error codes over the narrow band transmission medium;
    said means for receiving also receives the error codes from the narrow band transmission medium;
    means for updating each of the approximated digital words with the error code that corresponds to each of the approximated digital words; and
    said means for displaying also displays information derived from the updated approximated digital words, whereby a high resolution representation of the broad band information is obtained, wherein the high resolution representation of the broad band information is of higher resolution than the low resolution representations of the broad band information.

56. The apparatus of claims 54 or 55 wherein the error codes are transmitted in order of decreasing magnitude, whereby the approximated digital words are updated and displayed in order of decreasing magnitude of the corresponding error codes.

57. The apparatus of claims 54 or 55 further comprising means for responding to resolution control signals, wherein the resolution control signals identify a plurality of digital words, wherein the error codes of the digital words identified by the resolution control signals are transmitted prior to the error codes of the digital words not identified by the resolution control signals.

58. The apparatus of claims 54 or 55 wherein the error codes are of variable length, and wherein the length of the error codes is determined by the magnitude of the error code.

59. The apparatus of claims 54 or 55 wherein each of the error codes is associated with a location code that identifies the digital word to which the associated error code corresponds.

60. The apparatus of claims 54 or 55 wherein the high resolution representation of the broad band information is color information.

61. The apparatus of claims 54 or 55 wherein the least significant bit of each of the digital words contains color information, and wherein the high resolution representation of the broad band information is color information.

62. The apparatus of claims 54 or 55 wherein the least significant bit of each of the digital words contains color information, and wherein the high resolution representation of the broad band information is monochrome information.

63. The apparatus of claims 54 or 55 wherein the high resolution representation of the broad band information is monochrome information.

64. The apparatus of claims 54 or 55 wherein the least significant bit of each of the digital words contains monochrome information, and wherein the high resolution representation of the broad band information is monochrome information.

* * * * *

UNITED STATES PATENT AND TRADEMARK OFFICE
CERTIFICATE OF CORRECTION

PATENT NO. : 4,654,484

DATED : March 31, 1987

INVENTOR(S) : Leonard Reiffel; Wayne D. Jung; Richard A. Karlin; Raphael K. Tam

It is certified that error appears in the above-identified patent and that said Letters Patent is hereby corrected as shown below:

Column 7, line 5, "." should be -- , --

Column 7, line 29, "value" should be -- values --

Column 8, line 22, "same amount data" should be -- same amount of data --

Column 12, line 23, "33" should be -- 23 --

Column 12, line 50, "lins" should be -- lines --

Column 14, line 25, "Obviously" should be -- Obvious --

Column 14, line 55, "display" should be -- displaying --

Column 15, line 42, "where" should be -- wherein --

Column 17, line 65, "display" should be -- displaying --.

Signed and Sealed this

Eighth Day of March, 1988

Attest:

DONALD J. QUIGG

Attesting Officer

Commissioner of Patents and Trademarks